Dec. 3, 1946.                M. CAMRAS                2,411,848
                    NEON LAMP VOLUME INDICATOR
                       Filed Aug. 2, 1943

Inventor
MARVIN CAMRAS.
by
Charles Hill
Attys.

Patented Dec. 3, 1946

2,411,848

UNITED STATES PATENT OFFICE 2,411,848

NEON LAMP VOLUME INDICATOR

Marvin Camras, Chicago, Ill., assignor to Armour Research Foundation, Chicago, Ill., a corporation of Illinois Application August 2, 1943, Serial No. 497,099

6 Claims. (Cl. 177—311)

1

This invention relates to a neon lamp volume indicator and more specifically to a neon lamp volume indicator in which volumes in excess of a predetermined maximum are indicated as well as volumes less than a predetermined minimum.

Neon lamp volume indicators have a wide variety of uses but one of the commonest is to indicate that the volume is sufficiently great to make a proper recording on a phonograph recorder or the like. As will at once be apparent to those skilled in the art, it is not only important in cutting records that the volume be sufficiently great to make a proper recording but it is equally important that the volume be not in excess of a predetermined amount or otherwise a large amount of distortion is obtained in the record which is being cut.

It is an object of the present invention to provide a novel neon lamp volume indicator.

It is a further object of this invention to provide a novel neon lamp volume indicator and circuit in which two indications are employed—one to indicate that the volume is in excess of a predetermined minimum and the other to indicate that the volume is in excess of a predetermined maximum.

Another and further object of the present invention is to provide a novel neon lamp volume indicator having a neon lamp with a pair of glow plates therein, neither of which glow when the volume is below a predetermined minimum, one of which glows when the volume is within a predetermined desired range and both of which glow when the volume is in excess of a predetermined maximum.

A still further object of the present invention is to provide an indicator which may be employed to show that an alternating current voltage is between definite upper and lower limits.

Another and still further object of the present invention is to provide an indicator that may be employed to show that an alternating current voltage is within a desired predetermined voltage range and which includes means for readily adjusting the upper and lower limits of such range on the indicator.

The novel feature which I believe to be characteristic of my invention are set forth with particularity in the appended claims. My invention itself, however, both as to its organization and manner of construction, together with further objects and advantages thereof, may best be understood by reference to the following description, taken in connection with the accompanying drawing, in which:

2

Figure 1:
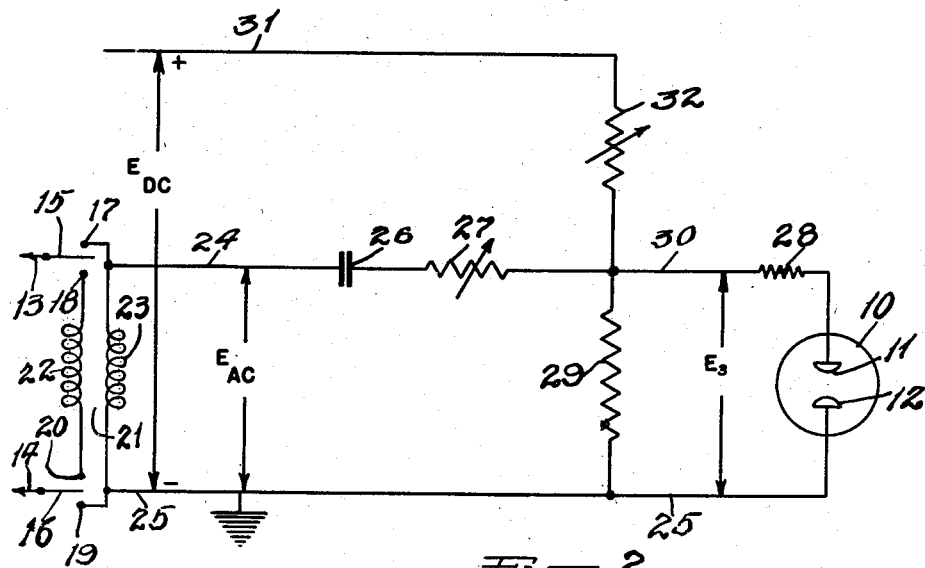
Figure 2:
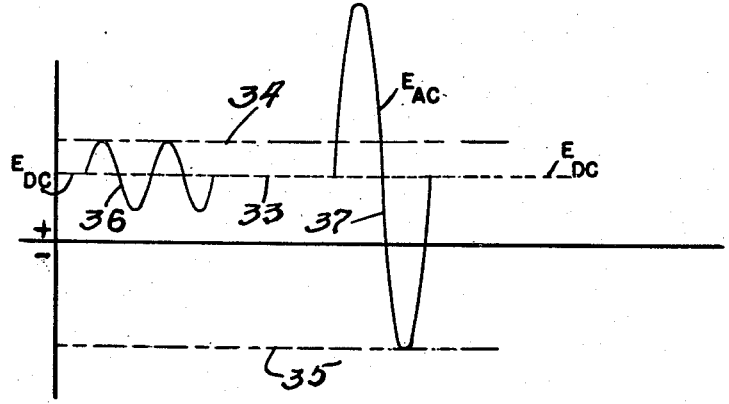

Figure 1 is a circuit diagram of one embodiment of my novel neon lamp volume indicator; and Figure 2 is a graph illustrating a minimum and a maximum voltage wave below which neither plate of a neon lamp will glow and above which both plates of a neon lamp will glow, respectively.

Referring now to Figure 1, there is illustrated therein a neon glow discharge lamp volume indicator circuit including a neon lamp 10 of the so called "cold electrode" type having glow plates 11 and 12. The alternating current whose voltage amplitude condition is arranged to be indicated by the neon lamp 10 is diagrammatically indicated by the conductors 13 and 14. When the neon lamp volume indicator is arranged to be employed in a phonograph recorder or the like these conductors 13 and 14 will be connected to the output of the audio amplifier. Conductor 13 is connected to a movable switch element 15 and conductor 14 is connected to a movable switch element 16. Two stationary contacts 17 and 18 are associated with the movable switch element 15 while two stationary contact elements 19 and 20 are arranged to be engaged by the movable switch element 16. The alternating current voltage wave appearing across the conductors 13 and 14 may be either directly impressed across the plates 11 and 12 of the neon lamp 10 by moving switch elements 15 and 16 into engagement with their respective associated contacts 17 and 19, or the voltage may be stepped up or stepped down through a transformer 21 by moving the switch elements 15 and 16 into engagement with their respective associated contacts 18 and 20. Contacts 18 and 20 are connected to the primary winding 22 of the transformer 21. The secondary winding 23 is connected at one end to a conductor 24 and also to stationary contact 17, and at the other end to a grounded conductor 25 and to the stationary contact 19.

The alternating current wave whose voltage amplitude condition is to be indicated by the neon lamp 10 is thus the same wave, or a direct function of the voltage wave appearing across conductors 24 and 25, and is indicated as E$_{AC}$.

In order to obtain the desired alternating voltage for the neon lamp 10, voltage divider means, comprising a variable resistor 27 and a load resistor 29, is connected across conductors 24 and 25. The neon lamp 10 in series with a load limiting resistor 28 is connected across the load resistor 29.

One of the important features of the present invention is to employ a direct current biasing potential in conjunction with the alternating voltage wave whose intensity condition is to be registered.

A source of direct current $E_{DC}$ is indicated as being supplied through a conductor 31 connected to the high potential side and conductor 25 which is connected to the low potential side through ground.

Voltage divider means which includes a variable resistor 32 and load resistor 29 is connected across the D. C. source represented by conductors 31 and 25. It will be noted that load resistor 29 is common to both the alternating current circuit as well as the direct current circuit and hence the instantaneous voltage impressed across the plates or electrodes 11 and 12 of the neon lamp 10 is a function of the algebraic sum of the instantaneous voltages derived from both the alternating and direct current sources. In order to keep direct current from being fed back into the A. C. source a condenser 26 is employed ahead of variable resistor 27.

The D. C. biasing voltage is chosen somewhat below the critical glow voltage of the neon lamp 10 as is indicated by the dotted line 33 in Figure 2. So long as a value of $E_{DC}$ is selected which is higher than any desired biasing potential across the neon lamp 10 the variable resistance element 32 may be adjusted until the desired value of the D. C. biasing potential across the neon lamp 10 is obtained. Now referring further to Figure 2 of the drawing, the dash-dot line 34 indicates the critical voltage of the neon lamp 10 for which one plate, such as for example 12, of the lamp 10 will glow due presumably to the positive column adjacent the positive electrode. The dash-dot line 35 indicates the negative critical voltage for which the other plate 11 of the neon lamp will glow due to the same effect. Since the D. C. biasing voltage indicated by the line 33 is less than the critical voltage 34, neither plate 11 or 12 of the neon lamp 10 will glow from just the D. C. biasing potential alone. If an alternating current potential indicated by the wave form 36 is impressed across conductors 24 and 25 it will be apparent that one plate of the neon lamp 10 will glow, such for example as plate 12. The magnitude of the voltage wave 36 indicates the minimum amplitude wave for which the plate 12 will glow. Obviously, any wave having an amplitude in excess of that shown by the wave 36 will cause the plate 12 to glow and for that reason the wave 36 indicates the lower limit of the desired range of operation.

In order to cause the other plate 11 of the neon lamp 10 to glow it is necessary to have a voltage wave whose amplitude is equal to or greater than the D. C. biasing voltage plus the critical voltage of the lamp. To state this in a somewhat different manner the negative half of the applied alternating voltage wave must be sufficiently great to reach the negative critical voltage of the lamp as indicated by the voltage wave 37, and it will thus be apparent that the voltage wave 37 indicates the minimum peak voltage value which will cause both of the plates 11 and 12 of the neon lamp 10 to glow. It will be observed that the positive half of the voltage wave is greatly in excess of the positive critical glow voltage line 34 while the negative half of the wave just reaches the negative critical glow voltage line 35.

It will further be observed from a study of Figure 2 that the variable resistor 32 of Figure 1 adjusts the ratio between the peak voltage necessary to cause both electrodes 11 and 12 to glow and the voltage necessary to cause only one electrode to glow. This, of course, is due to the fact that the variable resistor 32 adjusts the position of the D. C. biasing line 33. As the line 33 approaches the line 34 a smaller peak voltage is required in the value of $E_{AC}$ in order to make one plate or electrode of the neon lamp 10 glow. It will further be observed from an inspection of Figures 1 and 2 that the variable resistor 27 adjusts the minimum glow or firing voltage of the neon lamp 10.

Any alternating voltage wave having a peak value greater than that shown by the wave 36 and less than that shown by the wave 37 is within the desired operating range. It will thus be apparent that if neither electrode of the neon lamp 10 glows, the intensity or volume is below that desired. If both of the electrodes or plates 11 and 12 of the neon lamp 10 glow, the intensity or volume of the alternating current circuit 13, 14 is greater than that desired. When only one of the plates glow such, for example, as plate 12, the intensity or volume in the alternating current circuit 13, 14 is within the desired operating range.

While I have shown a particular embodiment of my invention, it will, of course, be understood that I do not wish to be limited thereto, since many modifications may be made, and I therefore, contemplate by the appended claims to cover all such modifications as fall within the true spirit and scope of my invention.

I claim as my invention:

1. A glow discharge lamp volume indicator comprising a glow discharge lamp having a pair of glow electrodes, circuit means arranged to be connected to a source of alternating current energy whose peak voltage condition is to be indicated, means for causing one electrode of said lamp to glow when the peak voltage of said source is greater than a predetermined desired minimum, and means for causing both electrodes of said glow discharge lamp to glow when the peak voltage of said source is greater than a predetermined desired maximum.

2. A glow discharge lamp volume indicator comprising a glow discharge lamp having a pair of glow electrodes, circuit means arranged to be connected to a source of alternating current energy whose peak voltage condition is to be indicated, means for impressing a D. C. biasing potential across said electrodes of a value less than the critical voltage of said lamp, means for varying the value of said D. C. biasing potential, means for impressing an alternating potential across said electrodes derived from said source to effect glow of neither, one, or both of said electrodes depending upon the peak value of said alternating potential, and means for varying the ratio of the peak value of said impressed alternating potential with respect to the peak value of said source.

3. A glow discharge lamp volume indicator comprising a glow discharge lamp having an pair of glow electrodes, a voltage divider including a pair of resistors connected in series, said electrodes of said glow discharge lamp being connected across one of said resistors, the other of said resistors being variable, circuit means arranged to connect said voltage divider across a source of direct current energy to bias said lamp at a value less than the critical voltage of said lamp, an additional circuit means arranged to connect said one resistor also across a source of alternating current energy whose peak voltage condition is to be indicated by glow of neither, one, or both of said electrodes depending upon the peak value of said alternating potential.

4. A glow discharge lamp volume indicator comprising a glow discharge lamp having a pair of glow electrodes, a voltage divider including a pair of resistors connected in series, said electrodes of said glow discharge lamp being connected across one of said resistors, the other of said resistors being variable, circuit means arranged to connect said voltage divider across a source of direct current energy to bias said lamp to less than its critical voltage, and additional circuit means arranged to connect said one resistor also across a source of alternating current energy whose peak voltage condition is to be indicated by glow of neither, one, or both of said electrodes depending upon the value of said peak voltage, said additional circuit means including a condenser arranged to pass alternating current of a frequency of said source of alternating current and a variable resistor in series.

5. A volume indicator comprising a glow discharge lamp having a pair of glow electrodes, an A. C. supply circuit whose peak voltage condition is to be indicated, a D. C. supply circuit, an A. C. voltage divider connected to said A. C. supply circuit, a D. C. voltage divider connected to said D. C. supply circuit, a portion of said A. C. voltage divider being common to a portion of said D. C. voltage divider and said electrodes of said lamp being connected to said common portion of said voltage dividers and having a D. C. bias voltage less than the critical voltage of said lamp so that neither, one, or both of said electrodes will glow depending upon the magnitude of said A. C. voltage.

6. A volume indicator comprising a glow discharge lamp having a pair of glow electrodes, an A. C. supply circuit whose peak voltage condition is to be indicated, a D. C. supply circuit, an A. C. voltage divider having a fixed resistance portion and a variable resistance portion connected to said A. C. supply circuit, a D. C. voltage divider having a variable resistance portion and also having the same fixed resistance portion as in said A. C. voltage divider, a load limiting resistor, said glow lamp being connected in series with said load limiting resistor across said common fixed resistance portion of said A. C. and D. C. voltage dividers and having a D. C. bias of less than critical voltage so as to effect glow of neither, one or both of said electrodes depending upon the magnitude of said A. C.

MARVIN CAMRAS.